(No Model.)
L. WOMMER.
CENTRIFUGAL CLEANER.
No. 449,788. Patented Apr. 7, 1891.
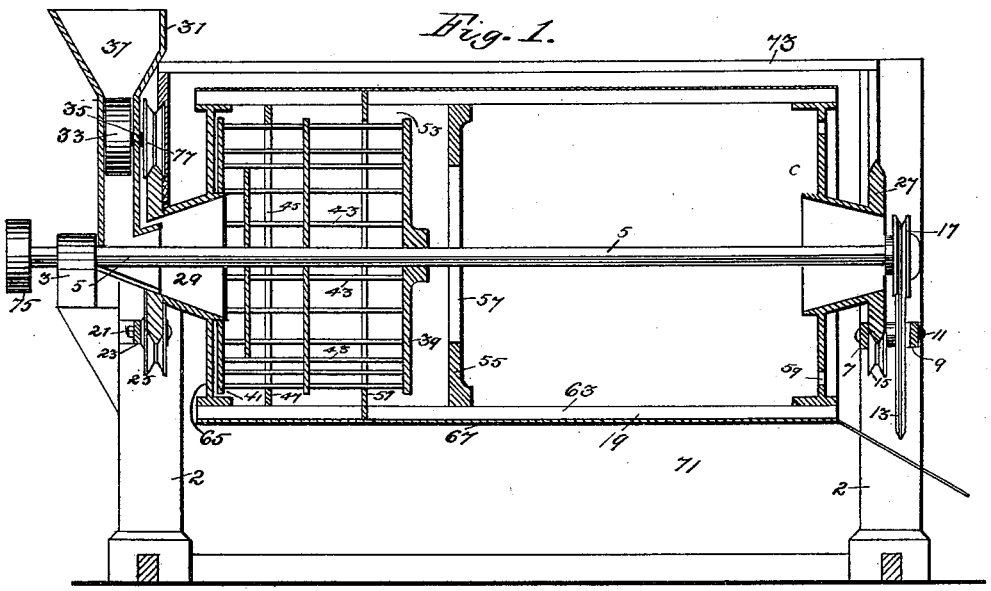
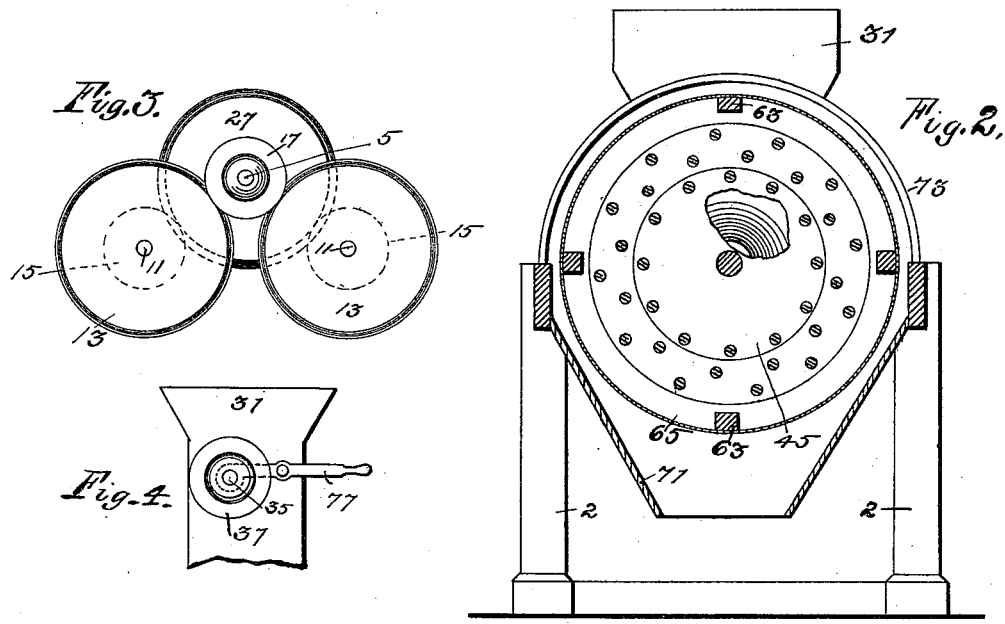
Witnesses
C. E. Van Doren.
A. M. Gaskill
Inventor
Louis Wommer
By Paul & Marvin Att'ys

UNITED STATES PATENT OFFICE.

LOUIS WOMMER, OF MINNEAPOLIS, MINNESOTA, ASSIGNOR OF ONE-HALF TO ALFRED W. PARIS, OF SAME PLACE.

CENTRIFUGAL CLEANER.

SPECIFICATION forming part of Letters Patent No. 449,788, dated April 7, 1891.

Application filed March 20, 1890. Serial No. 344,690. (No model.)

*To all whom it may concern:*

Be it known that I, LOUIS WOMMER, of Minneapolis, Hennepin county, Minnesota, have invented certain Improvements in Centrifugal Cleaners, of which the following is a specification.

My invention relates to improvements in machinery used for detaching and separating the outer husks or hulls or coverings from the kernels of nuts or grain; and the invention consists, generally, in the construction and combination hereinafter described, and particularly pointed out in the claims.

In the accompanying drawings, forming a part of this specification, Figure 1 is a longitudinal vertical section of my improved machine. Fig. 2 is a transverse vertical section on line $xx$ of Fig. 1. Figs. 3 and 4 are details.

In the drawings, 2 represents the frame-work of the machine, which may be of any suitable construction and formed of any suitable material.

Arranged at one end of the machine is a suitable bearing 3, that is supported upon the frame-work 2, and at the other end are bars 7 and 9, also secured upon the frame of the machine and supporting by suitable bolts 11 the friction-wheels 13 and 15, these wheels being preferably either cast in one piece or firmly secured together. A shaft 5 has one end mounted in the bearing 3, and its other end is provided with a friction-wheel 17, that rests upon the wheels 13. A cylinder 19, including a covering 67, of wire-cloth or other suitable material, is arranged in the frame of the machine, its frame-work being preferably formed of suitable heads 61 and 65 and longitudinal bars or ribs 63, upon which the wire-cloth or other covering 67 is secured. Each of the heads 61 and 65 has connected to it, preferably by an open center or tube, which may be of flaring form, as shown in Fig. 1, a friction-wheel 27. At the tail of the cylinder the wheel 27 rests upon the friction-wheels 15, and at the head of the cylinder the friction-wheel 27 rests upon friction-wheels 25, supported by bolts 21 upon a cross-bar 23. The open center 29 at the head of the cylinder forms the inlet-spout for the cylinder, and a suitable hopper 31 is connected with this inlet. This hopper is preferably provided with a feed-roll 33, secured upon the shaft 35, that carries a friction-roll 37, adapted to rest upon the top of the friction-wheel 27. A lever 77 is pivoted upon the wall of the hopper and connected with the shaft 35, and there is sufficient play or space in the opening in the wall of the hopper through which the shaft 35 passes to permit the wheel 37 to be raised sufficiently to clear the wheel 27. By this means the feed may be stopped at any time without stopping the machine.

The shaft 5 is preferably provided with a suitable belt-pulley 75, by means of which power may be applied thereto. A suitable beater-cylinder is secured upon the shaft 5 within the cylinder 19, and preferably at the head portion thereof, and this cylinder is constructed of a disk 39, secured upon the shaft 5, and other disks 41, 45, and 49, arranged parallel with the disk 39, and a series of rods or pins 43, that extend through all of said disks. These pins are preferably arranged to alternate with each other, as shown in Fig. 2. The disk 41 preferably has an open center surrounding the end of the tube 29, while the other disks form partitions that obstruct the passage of the material, so that it can only pass through the cylinder by passing around the edges of these disks. The cylinder 19 is also preferably provided with the rings or partitions 57 and 51, that extend inward from the circumference of said outer cylinder nearly to the outer row of pins in the inner cylinder. The disk 45 of the inner cylinder is preferably arranged quite near to the end of the open center 29 of the outer cylinder. The cylinder 19 is also preferably provided at a point near the disk 39 with a partition 55, having an open center 57, and the end 61 of this cylinder is preferably provided with openings 59, through which the material will finally pass from the cylinder. The disk 39 does not extend to the surface of the cylinder 19; but there is an open annular space 53 between the edge of the disk 39 and the inner surface of the cylinder 19.

In operating this machine the material to be acted upon is fed from the feed-hopper 31 and the open center 29 of the outer cylinder into the interior of the inner or beater cylinder. It then passes to the circumference of this cylinder, passes the partition 45, encountering the partition 47 on the outer cylinder, and is again moved toward the center of the inner cylinder. It passes back and forth from the center of the inner cylinder to the inner surface of the outer cylinder between the pins 43, and vice versa, until it has passed the last partition 55. The inner cylinder, it will be seen, is driven directly from the shaft 5, to which it is secured, while the outer cylinder is driven from the shaft 5 through the intermediate friction-wheels 17, 13, 15, and 27, and the two cylinders are thus rotated at different rates of speed, the difference in speed being determined by the relative sizes of the friction-wheels.

I claim as my invention—

1. In a centrifugal cleaner, the combination, with an outer cylinder having a covering of wire-cloth or similar material and provided with the series of inwardly-projecting annular partitions and an inner or beater cylinder consisting of a suitable shaft, a series of transverse partitions arranged upon said shaft, and a series of rods or pins extending through said partitions, of means for rotating both of said cylinders, substantially as described.

2. In a centrifugal cleaner, the combination, with the inner cylinder and its shaft 5, provided with the friction-wheels 17, of the friction-wheels 13, supporting said wheels 17 and driven therefrom, the wheels 15, connected to said wheels 13, the outer cylinder having the wheels 27 secured to its head, one of said wheels resting upon and driven by said wheels 15, and wheels 25, supporting the other wheels 27.

3. In a centrifugal cleaner, the combination, with the outer cylinder provided with the inwardly-projecting transverse partitions, the inner cylinder provided with the series of transverse partitions, and the series of longitudinally-arranged pins or rods supported by said partitions, of means for rotating said cylinders at different rates of speed, substantially as described.

4. In a centrifugal cleaner, the combination, with the cylinder provided with the friction-wheel 27, of the feed-roll 33, provided with the friction-wheel 37, adapted to engage and be driven by said friction-wheel 27, and the lever 77 for moving said friction-wheel 27 out of contact with the wheel 37, for the purpose set forth.

In testimony whereof I have hereunto set my hand this 10th day of March, 1890.

LOUIS WOMMER.

In presence of—
 S. W. ROBERTS,
 A. C. PAUL.